US011331838B2

(12) United States Patent
Schmidt

(10) Patent No.: US 11,331,838 B2
(45) Date of Patent: May 17, 2022

(54) SYSTEM FOR MICRO-MOLDING ARTICLES

(71) Applicant: Westfall Acquisition III, Inc., Las Vegas, NV (US)

(72) Inventor: Harald Schmidt, Georgetown (CA)

(73) Assignee: Westfall Acquisition III, Inc., Las Vegas, NV (US)

( * ) Notice: Subject to any disclaimer, the term of this patent is extended or adjusted under 35 U.S.C. 154(b) by 0 days.

(21) Appl. No.: 17/533,319

(22) Filed: Nov. 23, 2021

(65) Prior Publication Data

US 2022/0080640 A1 Mar. 17, 2022

Related U.S. Application Data

(62) Division of application No. 16/761,507, filed as application No. PCT/CA2018/050407 on Apr. 3, 2018, now Pat. No. 11,213,987.

(51) Int. Cl.
*B29C 45/77* (2006.01)
*B29C 45/27* (2006.01)
(Continued)

(52) U.S. Cl.
CPC .......... *B29C 45/77* (2013.01); *B29C 45/2703* (2013.01); *B29C 45/2806* (2013.01); *B29C 45/7613* (2013.01); *B29C 45/78* (2013.01); *B29C 2045/0094* (2013.01); *B29C 2045/2872* (2013.01); *B29C 2945/7619* (2013.01); *B29C 2945/76187* (2013.01); *B29C 2945/76381* (2013.01); *B29C 2945/76498* (2013.01);
(Continued)

(58) Field of Classification Search
CPC . B29C 45/2703; B29C 45/2806; B29C 45/77; B29C 45/7613; B29C 45/78; B29C 2045/0094; B29C 2045/2872; B29C 2945/76187; B29C 2945/7619; B29C 2945/76381; B29C 2945/76498; B29C 2945/76531; B29K 2059/00; B29K 2069/00; B29K 2995/004
USPC ..................................................... 264/328.13
See application file for complete search history.

(56) References Cited

U.S. PATENT DOCUMENTS 7,125,246 B2 10/2006 Schmidt
7,147,458 B2 12/2006 Schmidt
(Continued)

FOREIGN PATENT DOCUMENTS

CA 2483901 4/2005
JP 7119042 B2 12/1995

OTHER PUBLICATIONS

International Search Report and Written Opinion of International Application No. PCT/CA2018/050407, dated Dec. 20, 2018.
(Continued)

*Primary Examiner* — Matthew J Daniels
*Assistant Examiner* — Gregory C. Grosso
(74) *Attorney, Agent, or Firm* — Warner Norcross + Judd LLP

(57) ABSTRACT

A system is disclosed for micro-molding articles. The system melts and pre-pressurizes thermoplastic material to a first level, within a plasticizing barrel. The melt pressure of the thermoplastic material is manipulated to a second level, within a hot runner. The melt pressure of the thermoplastic material is manipulated to an ultra-cavity packing pressure within a valve gate nozzle.

9 Claims, 13 Drawing Sheets

(51) Int. Cl.
    *B29C 45/28*         (2006.01)
    *B29C 45/76*         (2006.01)
    *B29C 45/78*         (2006.01)
    B29C 45/00         (2006.01)
    B29K 59/00         (2006.01)
    B29K 69/00         (2006.01)

(52) U.S. Cl.
    CPC .............. *B29C 2945/76531* (2013.01); *B29K 2059/00* (2013.01); *B29K 2069/00* (2013.01); *B29K 2995/004* (2013.01)

(56) References Cited

U.S. PATENT DOCUMENTS

| | | |
|---|---|---|
| 7,997,895 B1 | 8/2011 | Schmidt |
| 8,047,836 B2 | 11/2011 | Schmidt |
| 8,834,150 B2 | 9/2014 | Schmidt |
| 8,899,965 B2 | 12/2014 | Schmidt et al. |
| 2005/0079242 A1* | 4/2005 | Schmidt ................ B29C 45/02 425/570 |
| 2012/0258284 A1* | 10/2012 | Rendon ............ A61M 37/0015 428/156 |

OTHER PUBLICATIONS

Drummer et al., Innovative process technologies for manufacturing thermoplastic micro pads—analysis and comparative assessment, Journal of Plastics Technology 8 (2012) 5, 30 pages.

\* cited by examiner

SYSTEM FOR MICRO-MOLDING ARTICLES

CROSS-REFERENCE TO RELATED APPLICATION(S)

This application is a divisional of U.S. patent application Ser. No. 16/761,507, filed May 5, 2020, which is a 371 application of PCT/CA2018/050407, filed Apr. 3, 2018, both of which are incorporated herein by reference in their entirety.

BACKGROUND

Unless otherwise indicated herein, the materials described in this section are not prior art to the claims in this application and are not admitted being prior art by inclusion in this section.

FIELD OF THE INVENTION

The subject matter in general relates to injection molding. More particularly, but not exclusively, the subject matter relates to injection molding of micro parts, controlling the pressure and temperature of the melt material within the injection molding apparatus and improving the melt residence time of the melt material; and potentially also measurably the cavity fill time.

DISCUSSION OF THE RELATED FIELD

State of the art injection molding machines for molding thermoplastic parts with the weight of one or more grams in one or a multitude of mold cavities utilize a heated injection barrel with an internal plunger screw. The thermoplastic (may also be referred to as plastic) pellets enter the barrel and is transported by the rotation of the screw inside the barrel. The screw length to diameter ratio is usually 20:1 and the plastic pellets melt while travelling towards the front end of the screw. At the front end of the screw the plastic material reaches the final processing temperature and the desired melt viscosity. The end of the screw is designed as a plunger with a check valve that prevents the melt to return or back up. The volume of the chamber in front of the screw meters the desired injection volume of the plastic melt. For metering a shot volume, the screw rotates and retracts to a controlled position. This screw motion recharges the melt chamber with every molding cycle and it is called the recharge phase. The melt in the chamber is low pressurized (due to backpressure) at this point and the heated melt expansion is at its highest level. The following injection phase transfers the melt from the barrel into the mold and fills the mold cavity or several mold cavities. With the beginning of the injection phase the screw inside the barrel moves forward to pressurize and displace the melt in front of the screw. The controlled force and speed of the screw's forward movement and the melt viscosity defines the rise of the injection pressure and the fill time of the cavity, because the plastic melt is a compressible fluid and the melt volume will change during the buildup of the injection pressure and the melt density increases or the specific melt volume decreases.

Not all the melt in front of the screw is being injected into the cavity; a certain amount does remain as a melt cushion in the front end of the barrel chamber to prevent the screw to bottom out with the injection stroke. Also, with the melt distribution within a hot runner system inside the mold, the hot runner melt channels contain an additional remaining melt volume. The total melt in front of the screw does add up to a considerable visco-elastic, compressible volume, that represents an injection metering problem in particular when it comes to molding small plastic parts.

The smallest screw diameter for the conventional injection molding machine measures 14.0 mm for regular size plastic pellets and injection pressure of up to 200 MPa is possible. Such melt pressure is often required for injecting high viscosity plastic melt. Thermoplastic materials such as PC, PSU or PEI are examples that do require such high melt pressure to fill mold cavities with thin walls and fine features. Smaller diameter screws would collapse when generating this high pressure. An exact metering of a small shot size with a 14.0 mm injection screw is not possible because 1.0 mm of stroke would generate an injection volume of 154 $mm^3$. Plastic micro parts with less than 100 $mm^3$, therefore, require a much higher resolution of the metering stroke, especially considering that the plastic melt is a compressible fluid of visco-elastic nature that changes its specific volume at high pressure.

In order to overcome the disadvantage of metering small melt volumes with a single unit screw/plunger combination, known as single step injection, the new state of the art micro injection molding machines have a screw and plunger combination, known as the two-step injection. Melting and heating the plastic material to the full extent of the recommended processing temperature in a screw barrel and injecting the melt with a separate plunger are two functional machine elements that are divided by a check valve or shut off valve. The screw in a separate heated barrel is melting the plastic pellets and heating the melt to the recommended melt processing temperature. A separate plunger barrel recharges the shot volume and generates the injection pressure and speed of the melt injection. With that design a small plunger diameter, e.g. 4.0 mm results in a longer plunger stroke. This provides a finer resolution and more accurate control of the injection stroke. For example, a diameter 4.0 mm plunger with the stroke of 1.0 mm represents a shot volume of only 12.56 $mm^3$. In this example, theoretically, to obtain a 100 $mm^3$ micro part volume a plunger stoke of 8.0 mm may be required.

However, metering a micro part of less than 10 $mm^3$ with a 4.0 mm plunger would present another shot control challenge, especially when micro parts require cycle after cycle a part weight consistency of less than ±5%. In this case a stroke control of the plunger would have to be within less than ±0.04 mm. When scaling the micro part further down to a 1 $mm^3$, the plunger stroke control would require a 0.004 mm repetitive accuracy. That however is not the only limitation.

The smaller the micro part volume is, the exact metering of the micro part volume with a 4.0 mm plunger becomes increasingly difficult. The plunger stroke in prior art 2-step micro molding machines build up dynamic change in the melt viscosity, melt injection volume and melt density. These processing variables increase in molds with the increase of mold cavities, because the melt distribution channels from the plunger to the micro mold cavities contain much larger melt volume than the micro parts themselves. Therefore 2-step plunger injection molding machines are limited to the use of low cavity molds. This results in low production output. Metering melt with only one plunger into multiple micro cavities (e.g. 8, 16, 32 cavities) and distributing the melt through the multi-branched, naturally branched melt channel system inside a mold known as cold runners or hot runners leads to more melt volume. These runner channels would constitute an exponential increase in compressible melt volume in front of the plunger. For example, 1000 mm³ runner volume of PP melt at 230° C. can compress from 0 MPa melt pressure to 200 MPa by 20%. The volumetric change is 200 mm³. In other words, the melt absorbs 20% of the plunger stroke and stores part of it as visco-elastic energy and internal friction heat energy. Under these conditions a consistent and reproducible micro injection molding process is difficult to control and to maintain.

The complexity increases further with the increase of the melt residence time when molding smaller and smaller micro parts with a part volume below 10 mm³. The melt residence time is the time during which the melt is exposed to the processing temperature while it travels from the screw barrel into the plunger and from there into the mold cavities through distribution channels. Thermoplastic materials and additives do not tolerate exposure to processing temperature for a long period without experiencing thermal degradation and a loss of physical properties. Micro parts are typically injection molded with a cycle time of 3 to 6 seconds or 10 to 20 molding cycles per minute, this will result in a melt residence time of more than an hour. Many thermoplastic materials experiences under these conditions a significant level of melt degradation. As an example, the melt residence time of POM at 200° C. processing temperature is only about 10-15 minutes. As another example, the melt residence time of PSU at 385° C. processing temperature is about 20-30 minutes. In these cases, a 10, 100 or even 1000-fold cold runner volume is often getting attached to the actual micro part in order to improve the melt residence time by an increase of the shot volume. However, the cold runner is wasted material. It dilutes the process control and is certainly not an option when processing costly thermoplastic materials, where the price can exceed 100 USD/kg or even more than 1000 USD/kg.

Micro parts are defined by the part weight that is less than 1000 milligram. But injection molding process for parts with less than 100 mg or even with a weight smaller than 10 milligrams is getting increasingly more demanding.

Micro parts measure only millimeters in size or less and the dimensional tolerances are often defined in the micro meter range. It is of utmost importance to hold a fully automated production within the specified tolerances. But holding the tolerances and the weight and replicating the microscopic features of the mold cavity part is not the only objective. The quality of the micro parts may have high demanding optical properties, electrical and mechanical properties. The micro molding process is not directly comparable with the injection molding process that is used for larger size plastic parts, because the polymer morphology developed in micro parts is different to the ones developed in larger plastic part. For example, the melt heat enthalpy of a micro part, with a volume that is often less than a plastic pellet, is very low. Therefore, the melt cools quickly within a fraction of a second when the melt fills the mold cavity. This rapid cooling time at a high cavity melt pressure leads to a much faster solidification than it is the case with a two-step injection molding process.

The single and two-step molding process is trying to compensate for the shrinkage by applying additional melt into the cavity during the hold phase or packing pressure phase. The packing phase during the cooling time is only effective inside the cavity as long as the flow orifice or gate is open and has not solidified. This limits the dimensional process control. A hot runner valve gate is a positive shut off device that also offers a larger gate orifice, that will keep the gate open long enough for packing. The part shrinkage continues after the micro parts has been ejected from the cavity. This results in further changes of dimensional tolerances that differ from the actual cavity dimensions. The conventional micro injection molding machines try to compensate for the shrinkage of the plastic part before the part solidification with a packing pressure that may be applied using a plunger. This phase in the molding cycle is meant to deliver more melt into the micro cavity while the part undergoes a volumetric shrinkage during cool down. Since the micro parts in a two-step process are typically molded with attached cold runners, the connection channel (so called tunnel gate) between the cold runner and the micro cavity solidifies and the compensation of the part shrinkage with the required additional melt supply into the cavity is not possible. The consequence is a poor quality micro part and a well packed cold runner as a waste material by-product.

U.S. Pat. No. 4,662,837 granted May 5, 1987 to Husky shows a conventional injection molding for preparing molded articles. Molten plastic material proceeds through an injection conduit into a manifold, using pressure molding means. The molten plastic material is then directed into injection nozzles via injection nozzle channels. Die assembly, having a die cavity, is provided at the tip of the nozzles. The nozzle injects the molten plastic material into the die cavity. An arrangement according to the instant patent fails to increase the pressure and temperature of the molten plastic material from the time the material introduced into the injection conduit and till it exits the tip of the nozzle. As the melt temperature of the material is maintained throughout the apparatus (of the instant patent application), the material experiences thermal degradation and a loss of physical properties.

U.S. application Ser. No. 10/681,065 filed on Oct. 8, 2003 by Hummingbird shows a barrel comprising a screw to inject the plastic material out of the barrel and into a manifold. The melt plastic material flows within the runner system defined by the manifold. A metering apparatus is connected to the manifold to meter out the required melt from the manifold and into the injection apparatus (nozzle). The injection apparatus injects the metered melt into the mold cavity.

EP Pat. No. 1912773 explains a method for producing a molded element. The melt is introduced into a molding tool. The pressure of the melt is increased to such a degree by the mold that the melt solidifies. The melt is then cooled to obtain the desired product. The instant patent also describes a control mechanism for varying the pressure within the mold cavity, which may be controlled using a computer program. The instant patent fails to increase the pressure and temperature of the molten plastic material from the time the material introduced into the injection conduit and till it exits the tip of the nozzle. As the melt temperature of the material is maintained throughout the apparatus (of the instant patent application), the material experiences thermal degradation and a loss of physical properties. Also, the instant patent exhibits more shrinkage than is desirable.

U.S. 66/320,791 entitled Dynamic Feed to Kazmer utilizes a multi cavity valve gate hot runner system and melt pressure sensors for the control of the machine melt pressure during the injection fill time and the hold pressure time. In multi cavity molds a portion of the valve pins is shaped as a cone and it acts as an adjustable choke inside the hot runner melt channel individually for each nozzle to vary the melt pressure profile while filling and packing individual mold cavities. The advantage is that each mold cavity can receive its own individual melt pressure profile to optimize the part shrinkage, therefore precision parts with different wall section thickness and part geometry can be molded inside a multi cavity mold.

EP 0461143A1 entitle A Method For Controlling The Holding Pressure Phase During The Injection Molding Of Thermoplastics to Lauterbach and DE3608973A1 to Wippenbeck entitled Process And Device For Controlling The Compression Phase In The Injection Molding Of Thermoplastic Molding both teach controlling the molding parameters with machine screw control. This conventional injection pressure profile for each injection cycle starts always with atmospheric melt pressure. The pressure of the machine screw barrel rises to fill the cavity. The melt compression by the screw forward movement is part of the shot metering. At the end of the cavity fill phase follows the packing pressure that compensates for the volumetric shrinkage of the plastic material while it cools until it reaches the solid state at the transition temperature. From there on the thermoplastic part inside the mold cavity continues to shrink until it reaches the part ejection temperature and finally cools down to room temperature.

In view of the foregoing discussion, there is a need for an improved and enhanced technique for molding micro parts and improving the residence time within the molding apparatus.

SUMMARY

In an embodiment a system is provided for micro-molding articles by cascading temperature and pressure of the thermoplastic material as the thermoplastic material travels from the plasticizing barrel to exit from a valve gate nozzle to enter a mold cavity. The system melts and pre-pressurizes thermoplastic material to a first level, within a plasticizing barrel. The melt pressure of the thermoplastic material is manipulated to a second level, within a hot runner. The pressure at the first level is less than the pressure at the second level. The melt pressure of the thermoplastic material is manipulated to an ultra-cavity packing pressure within a valve gate nozzle. The pressure at the second level is less than the ultra-cavity packing pressure.

In another embodiment, the thermoplastic material is heated to a first temperature before the thermoplastic material exits the plasticizing barrel. The first temperature is more than a melting temperature of the thermoplastic material and less than a processing temperature of the thermoplastic material. Further, the thermoplastic material is heated to a processing temperature after the thermoplastic material exits a manifold but before the thermoplastic material exits a valve gate nozzle.

In yet another embodiment, temperature of the thermoplastic material is regulated in a heated first manifold. Further, temperature of the thermoplastic material is regulated in a heated sub-manifold which branches from the first manifold. Additionally, temperature of the thermoplastic material is regulated in a heated nozzle through which the thermoplastic material enters a mold cavity. The heated nozzle in itself may have multiple temperature profiled heated zones with a temperature closest to the mold cavity controlling the desired melt processing temperature.

In yet another embodiment, a first movement assembly is actuated to discharge the thermoplastic material out of the plasticizing barrel and into a manifold. Actuating the first movement assembly comprises rotating a screw located within the plasticizing barrel. Further, a second movement assembly is actuated to control quantum of discharge of the thermoplastic material from the manifold and into a nozzle. Actuating the second movement assembly comprises movement of a plunger in a first direction or a second direction, which is opposite of the first direction, based on desired quantum of discharge of the thermoplastic material from the manifold and into a nozzle. Additionally, a third movement assembly is actuated to regulate discharge of the thermoplastic material out of the nozzle and into a mold cavity. Actuating the third movement assembly comprises movement of a nozzle plunger in an opening direction or a closing direction to allow discharge of the thermoplastic material out of the nozzle or to arrest discharge of the thermoplastic material out of the nozzle, respectively.

In yet another embodiment, backflow of the thermoplastic material from a sub-manifold and into a first manifold is prevented past a first manifold check valve, wherein the sub-manifold branches from the first manifold. Further, backflow of the thermoplastic material from the first manifold and into the plasticizing barrel is prevented past a plasticizing barrel check valve, wherein the first manifold receives the thermoplastic material from the plasticizing barrel.

BRIEF DESCRIPTION OF DRAWINGS

Embodiments are illustrated by way of example and not limitation in the figures of the accompanying drawings, in which like references indicate similar elements and in which.

DETAILED DESCRIPTION

The following detailed description includes references to the accompanying drawings, which form a part of the detailed description. The drawings show illustrations in accordance with example embodiments. These example embodiments, which may be herein also referred to as "examples" are described in enough detail to enable those skilled in the art to practice the present subject matter. However, it may be apparent to one with ordinary skill in the art, that the present invention may be practised without these specific details. In other instances, well-known methods, procedures and components have not been described in detail so as not to unnecessarily obscure aspects of the embodiments. The embodiments can be combined, other embodiments can be utilized, or structural, logical, and design changes can be made without departing from the scope of the claims. The following detailed description is, therefore, not to be taken in a limiting sense, and the scope is defined by the appended claims and their equivalents.

In this document, the terms "a" or "an" are used, as is common in patent documents, to include one or more than one. In this document, the term "of" is used to refer to a nonexclusive "or," such that "A or B" includes "A but not B," "B but not A," and "A and B," unless otherwise indicated.

It should be understood, that the capabilities of the invention described in the present disclosure and elements shown in the figures may be implemented in various forms of hardware, firmware, software, recordable medium or combinations thereof.

Disclosed is a method for micro-molding articles by cascading temperature and pressure of the thermoplastic material as the thermoplastic material travels from the plasticizing barrel to exit from a valve gate nozzle to enter a mold cavity. The thermoplastic material is melted and pre-pressurized to a first level, within a plasticizing barrel. The thermoplastic material exits the plasticizing barrel and enters the manifold. A plasticizing barrel check valve prevents the backflow of the thermoplastic material from the manifold and into the plasticizing barrel. Melt pressure of the thermoplastic material is manipulated to a second level, within a hot runner. The pressure at the first level is less than the pressure at the second level. Melt pressure of the thermoplastic material is manipulated to an ultra-cavity packing pressure within a valve gate nozzle. The pressure at the second level is less than the ultra-cavity packing pressure. Further, the thermoplastic material is heated to a first temperature before the thermoplastic material exits the plasticizing barrel, wherein the first temperature is more than a melting temperature of the thermoplastic material and less than a processing temperature of the thermoplastic material. The thermoplastic material is heated to a processing temperature after the thermoplastic material exits a manifold but before the thermoplastic material exits a valve gate nozzle.

Figure 1:
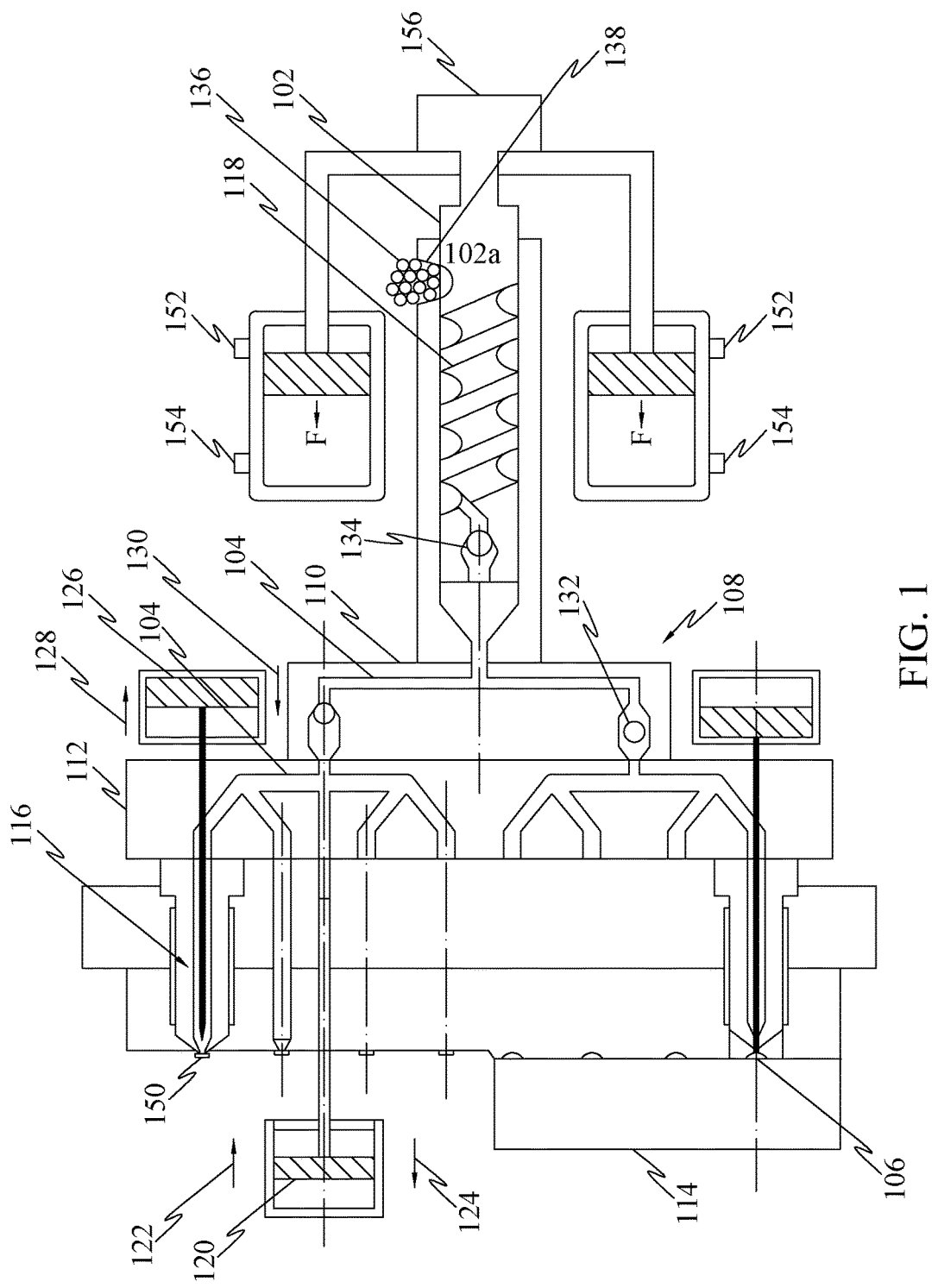
FIG. 1 is an exemplary illustration of a molding apparatus for micro-molding articles, in accordance with an embodiment.
Figure 2:
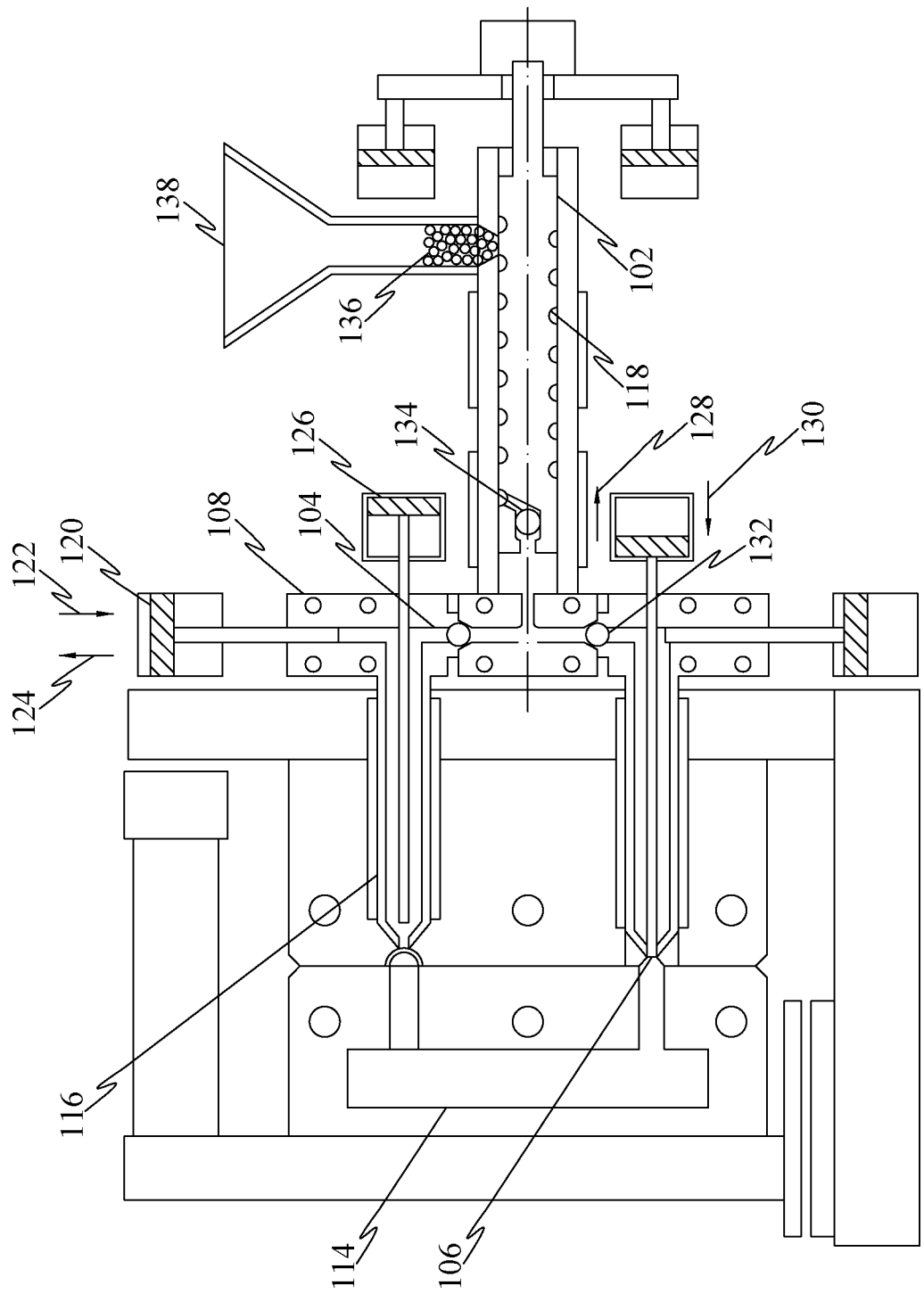
FIG. 2 is an alternate exemplary embodiment of a molding apparatus for micro-molding articles.

Referring to FIG. 1 and FIG. 2, a molding apparatus for micro-molding articles is provided. In an embodiment, melt pressure within the molding apparatus is increased from atmospheric pressure to ultra-cavity packing pressure in a series of steps. The molding apparatus may include a plasticizing barrel 102, a manifold 108 and a nozzle 116.

The thermoplastic material may be introduced into the plasticizing barrel 102 using a hopper 138, in the form of pellets 136. In an embodiment, a first movement assembly may be used to discharge the thermoplastic material out of the plasticizing barrel 102 and into a manifold 108. The first movement assembly may comprise a screw 118 that may be rotatable within the plasticizing barrel 102 using a motor. In an embodiment, electrical linear motors or stepper motors with transducers may be used. The rotation of the screw 118 may propel the screw 118 forward or backward depending on the direction of rotation of the screw 118. The screw 118 inside the plasticizing barrel may pre-pressurize the thermoplastic material to a first level. The thermoplastic material within the plasticizing barrel 102 may be kept at a constant pressure. The screw 118 propels the thermoplastic material into the first manifold 110. The plasticizing barrel check valve 134, located at the tip of the screw 118 prevents the backflow of the thermoplastic material from the first manifold 110 and into the plasticizing barrel 102.

The position of the screw 118 is governed by the location of the two cylinders exerting force F on the screw 118 as they are driven by rotary motor 156. The cylinders exerting force F also serve to maintain a fixed pressure in the barrel 102 by movement between the limit switches 152, 154 in the fore and aft positions.

In an embodiment, the first manifold 110 may define hot runner 104. The first manifold 110 branches out into sub-manifold 112. The sub-manifold 112 may define hot runner 104. The thermoplastic material received by the first manifold 110 from the plasticizing barrel 102 flows through the hot runner 104 and into the hot runner 104 of the sub-manifold 112.

In an embodiment, the hot runner 104 of the manifold 108 may increase melt pressure of the thermoplastic material to a second level. In an embodiment, pressure at the first level may be less than the pressure at the second level.

In an embodiment, a second movement assembly controls quantum of discharge of the thermoplastic material from the manifold 108 and into a nozzle 116. The second movement assembly comprises a plunger 120 to discharge metered quantity of the thermoplastic material into the nozzle 116. The movement of the plunger 120 in a first direction 124 or a second direction 122 discharges desired quantum of the thermoplastic material from the manifold 108 and into the nozzle 116. In an embodiment, the first direction 124 and the second direction 122 are opposite to each other.

In an embodiment, the backflow of the thermoplastic material from a sub-manifold 112 and into the first manifold 110 may be controlled using a first manifold check valve 132.

In an embodiment, a third movement assembly is provided to regulate the discharge of the thermoplastic material out of the nozzle 116 and into a cavity of the mold 114. The third movement assembly comprises a nozzle plunger 126.

Figure 3:
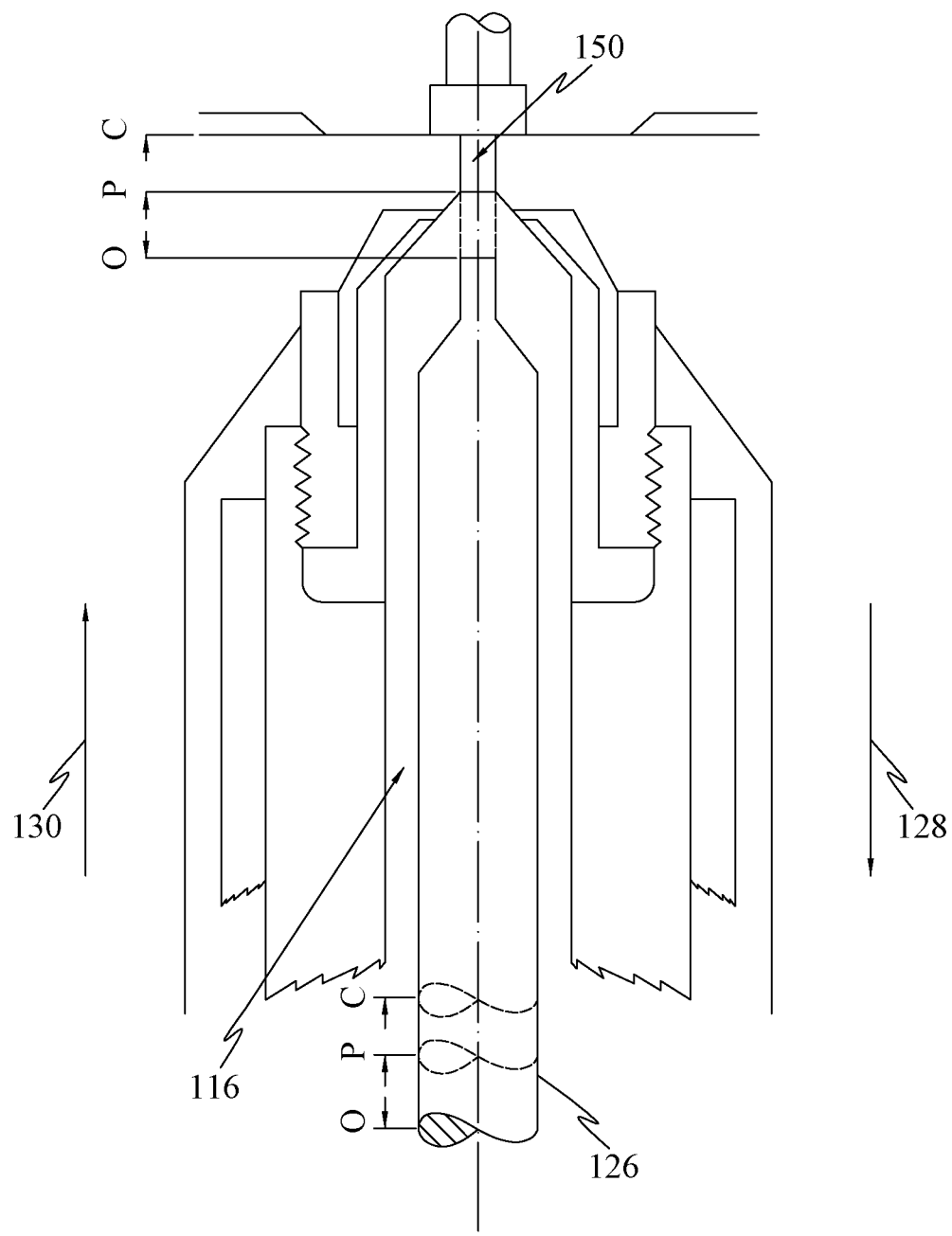
FIGS. 3 and 4 are detailed view of valve gate nozzle 106.

Referring to FIG. 3, the movement of the nozzle plunger 126 in an opening direction 128 allows discharge of the thermoplastic material out of the nozzle 116 and into the cavity of the mold 114 through the valve gate nozzle. The open position of the nozzle plunger 126 is denoted by "O". At position "P" the nozzle plunger 126 plunges within the nozzle 116 to develop the ultra-cavity packing pressure in the micro cavity 150 on the thermoplastic material and inject the thermoplastic material into the cavity of the mold 114.

Figure 4:
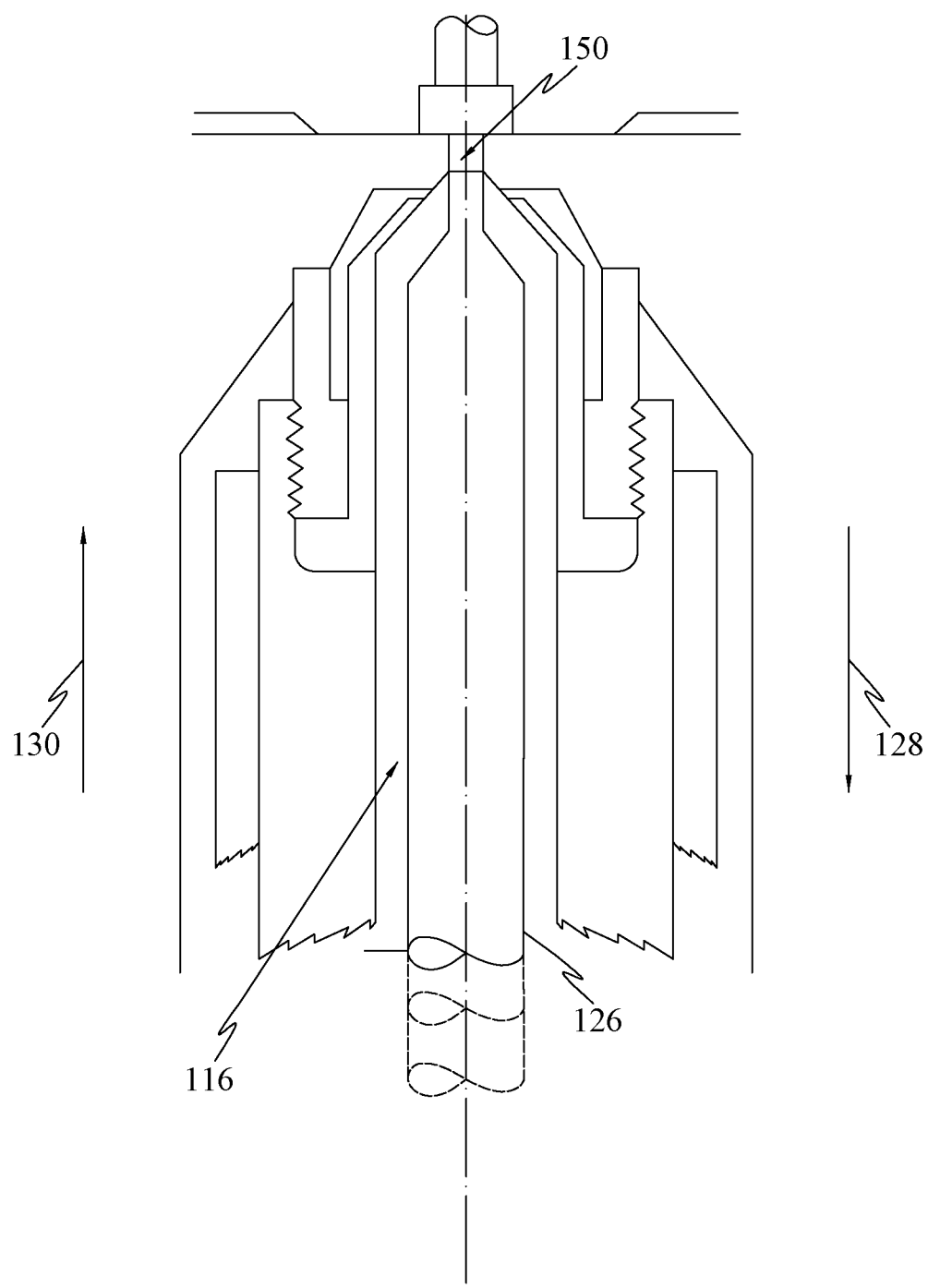

Referring to FIG. 4, the movement of the nozzle plunger 126 in a closing direction 130 arrests the discharge of the thermoplastic material out of the nozzle 116 and into the micro cavity 150 and through the valve gate nozzle. The close position of the nozzle plunger 126 is denoted by "C". In an embodiment, the nozzle plunger 126 at position "P" may impart the extra push to the thermoplastic material to pressure pack it into the cavity of the mold 114. The movement from the open position to the closed position allows greater pressures than previous prior art systems to be attained. In an embodiment, the pressure at the second level is less than the ultra-cavity packing pressure. In an embodiment, the ultra-cavity packing pressure of 300 MPa to 600 MPa inside the cavity of the mold 114 may be achieved.

In an embodiment, temperature of the thermoplastic material within the molding apparatus is increased in a cascading manner as the thermoplastic material travels from the plasticizing barrel 102 to exit from a valve gate nozzle 106 to enter a cavity of the mold 114.

In an embodiment, the thermoplastic material is heated to a first temperature before the thermoplastic material exits the plasticizing barrel 102 to enter the manifold 108. The first temperature is more than a melting temperature of the thermoplastic material and less than a processing temperature of the thermoplastic material. Further, the thermoplastic material is heated to a processing temperature after the thermoplastic material exits the manifold 108 and enters the nozzle 116. The processing temperature of the thermoplastic material is maintained in the nozzle till it exits the valve gate nozzle 106 and into the cavity of the mold 114 to form the desired mold article. When the mold article has cooled to the de-molding temperature and is rigid enough, the cavity of the mold 114 opens and the mold article is ejected. Outside the cavity of the mold 114, the mold article cools further down to room temperature.

Figure 5:
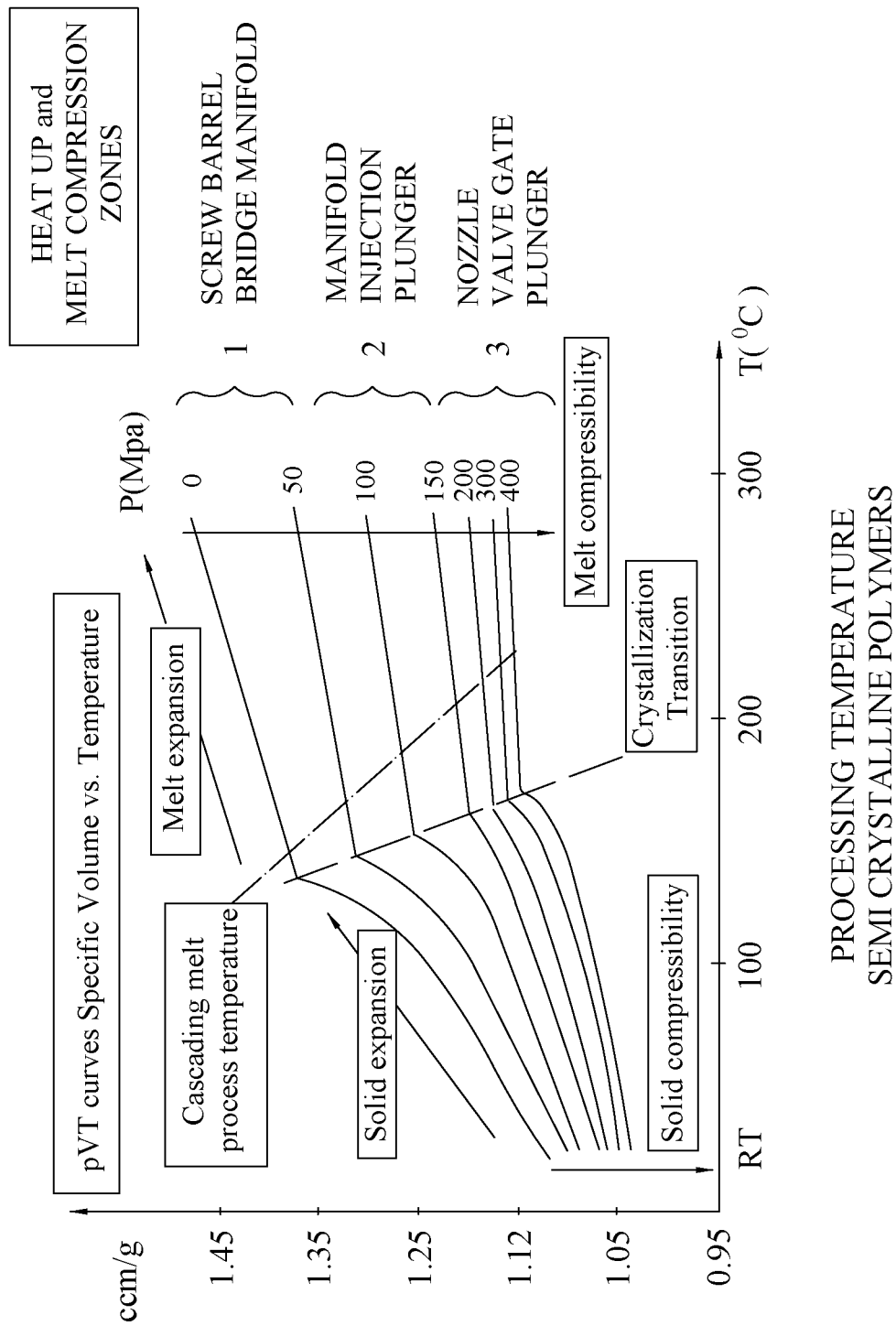
FIG. 5 is a ρVT graph of semi-crystalline polymers as it moves according to the proposed method.
Figure 8:
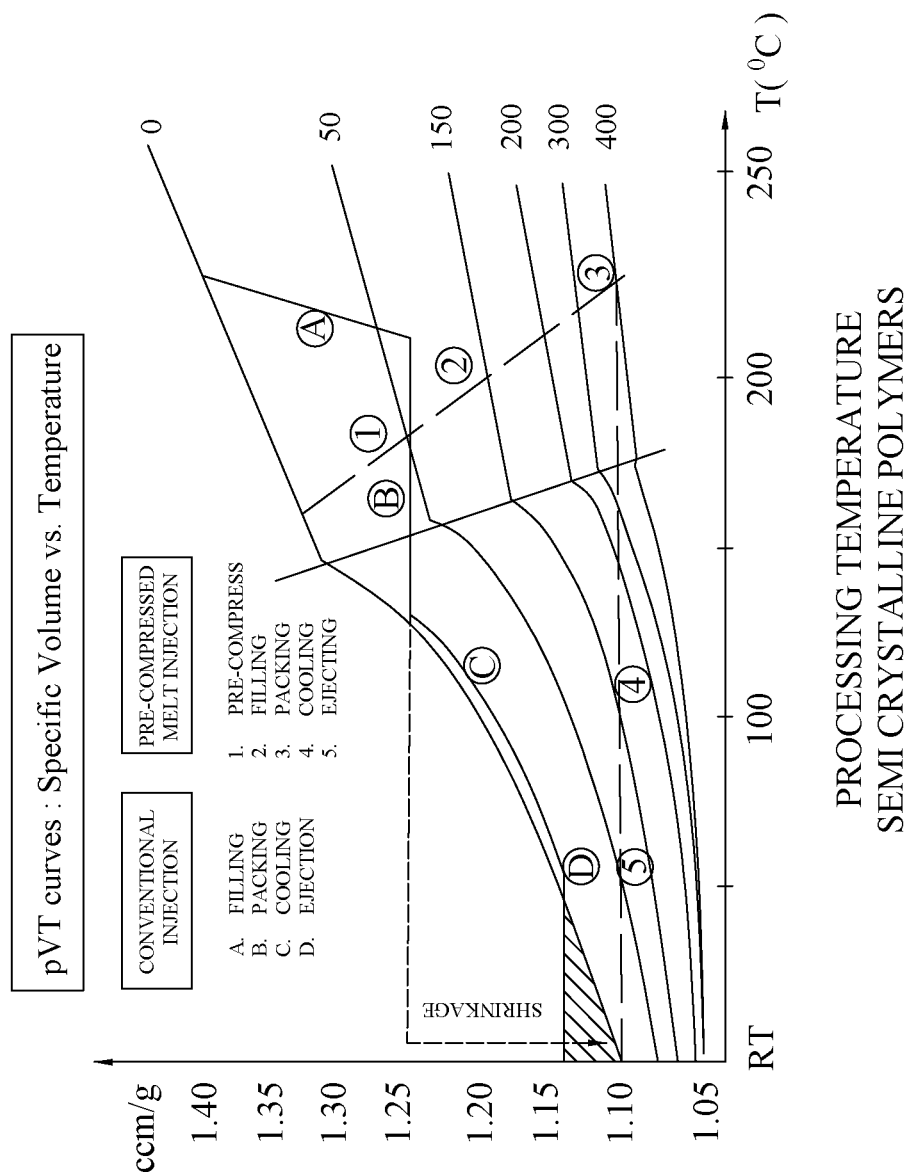
FIG. 8 is a ρVT graph of semi-crystalline polymers as it moves according to the proposed method.
Figure 12:
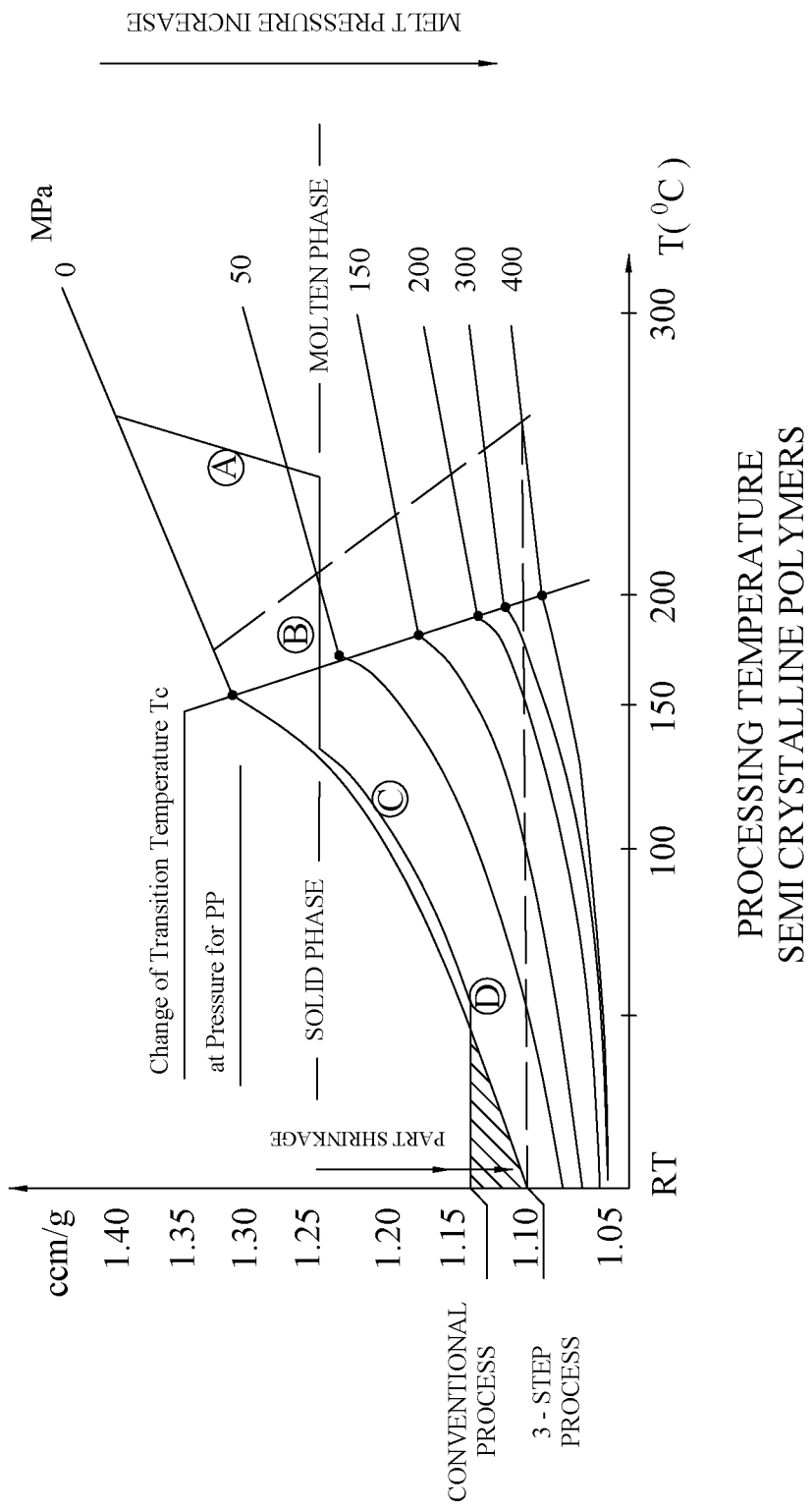
FIG. 12 is a ρVT graph of semi-crystalline polymers as it moves according to the proposed method.

FIGS. 5, 8 and 12 is a ρVT (density/volume/temperature) graph of semi-crystalline polymers as it moves through the system implementing the method. The pressure within the plasticizing barrel 102 is maintained constant. At this point the specific volume of the semi-crystalline polymer is at its maximum. Also, the semi-crystalline polymer may be heated to a first temperature within the plasticizing barrel 102. The temperature may be more than a crystallization transition temperature of the semi-crystalline polymers and less than a processing temperature of the semi-crystalline polymers. As an example, referring to the graph in FIG. 5, the pressure within the plasticizing barrel 102 for semi-crystalline polymers may be between 0-50 MPa. As the semi-crystalline polymer exits the plasticizing barrel 102 and enters the manifold 108 (hot runner 104), the pressure within the manifold 108 (hot runner 104) is increased to a second level and the temperature may be cascaded. And in doing so the specific volume of the semi-crystalline polymers decreases from what it was in the plasticizing barrel 102. As an example, referring to the graph in FIG. 5, the pressure within the manifold 108 (hot runner 104) for semi-crystalline polymers may be between 50-150 MPa. As the semi-crystalline polymer exits the manifold 108 (hot runner 104) and enters the nozzle 116, the pressure within the nozzle 116 is increased to an ultra-cavity packing pressure and the temperature may be further cascaded to a processing temperature. And in doing so the specific volume of the semi-crystalline polymers further decreases from what it was in the manifold 108 (hot runner 104). The ultra-cavity packing pressure may be at its maximum at the valve gate nozzle 106. As an example, referring to the graph in FIG. 5, the pressure within the nozzle 116 for semi-crystalline polymers may be between 150-400 MPa.

FIG. 5 also represents a crystallization transition line wherein the semi-crystalline polymers melts from solid. Further, a cascading melt processing temperature line for the semi-crystalline polymers is also shown.

Also, referring to FIG. 8, in the proposed method, during the packing (3), cooling (4) and ejection (5) of the molded part from the cavity of the mold 114 the density remains the same. There is no shrinkage of the molded part at room temperature. Whereas, in the prior art, the density of the molded part during the packing phase (B) is high and reduces during the cooling phase (C) and the density during the ejection (D) of the molded part may further reduce. Further, when the molded part reaches the room temperature, the molded part may shrink again resulting in reduced density of the molded part.

Figure 6:
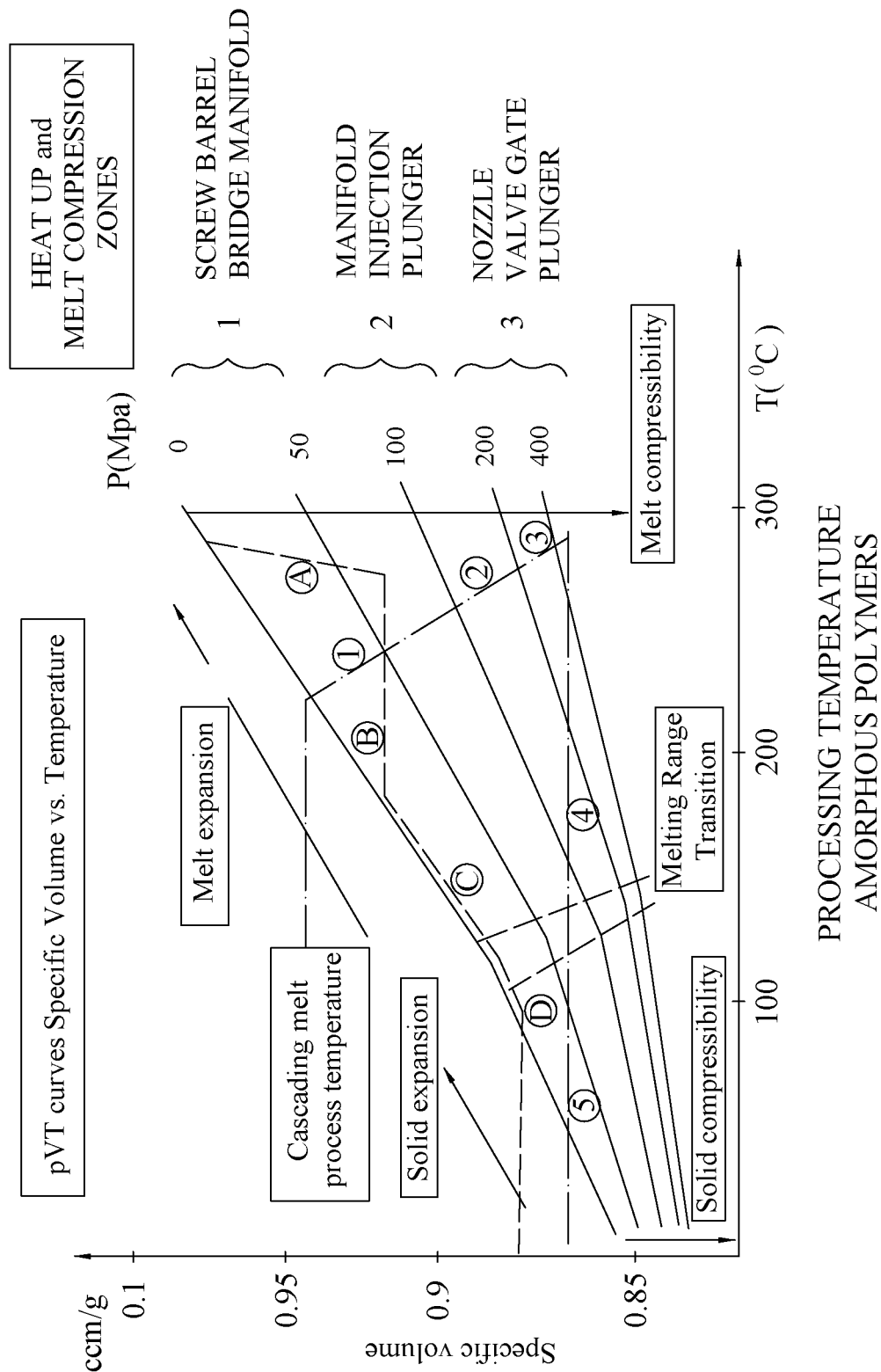
FIG. 6 is a ρVT graph of amorphous polymers as it moves according to the proposed method.

FIG. 6 is a ρVT (density/volume/temperature) graph of amorphous polymers as it moves through the system implementing the method. The pressure within the plasticizing barrel 102 is maintained at a first level to begin with. At this point the specific volume of the amorphous polymer is at its maximum. Also, the amorphous polymer may be heated to a first temperature within the plasticizing barrel 102. The temperature may be more than a melting temperature of the amorphous polymers and less than a processing temperature of the amorphous polymers. As an example, referring to the graph in FIG. 6, the pressure within the plasticizing barrel 102 for amorphous polymers may be between 0-50 MPa. As the amorphous polymer exits the plasticizing barrel 102 and enters the manifold 108 (hot runner 104), the pressure within the manifold 108 (hot runner 104) is increased to a second level and the temperature may be cascaded. And in doing so the specific volume of the amorphous polymers decreases from what it was in the plasticizing barrel 102. As an example, referring to the graph in FIG. 6, the pressure within the manifold 108 (hot runner 104) for amorphous polymers may be between 50-150 MPa. As the amorphous polymer exits the manifold 108 (hot runner 104) and enters the nozzle 116, the pressure within the nozzle 116 is increased to an ultra-cavity packing pressure and the temperature may be further cascaded to a processing temperature. And in doing so the specific volume of the amorphous polymers further decreases from what it was in the manifold 108 (hot runner 104). The ultra-cavity packing pressure may be at its maximum at the valve gate nozzle 106. As an example, referring to the graph in FIG. 6, the pressure within the nozzle 116 for amorphous polymers may be between 150-400 MPa.

FIG. 6 also represents a melting range transition line wherein the amorphous polymers melts from solid. Further, a cascading melt processing temperature line for the amorphous polymers is also shown.

Figure 7:
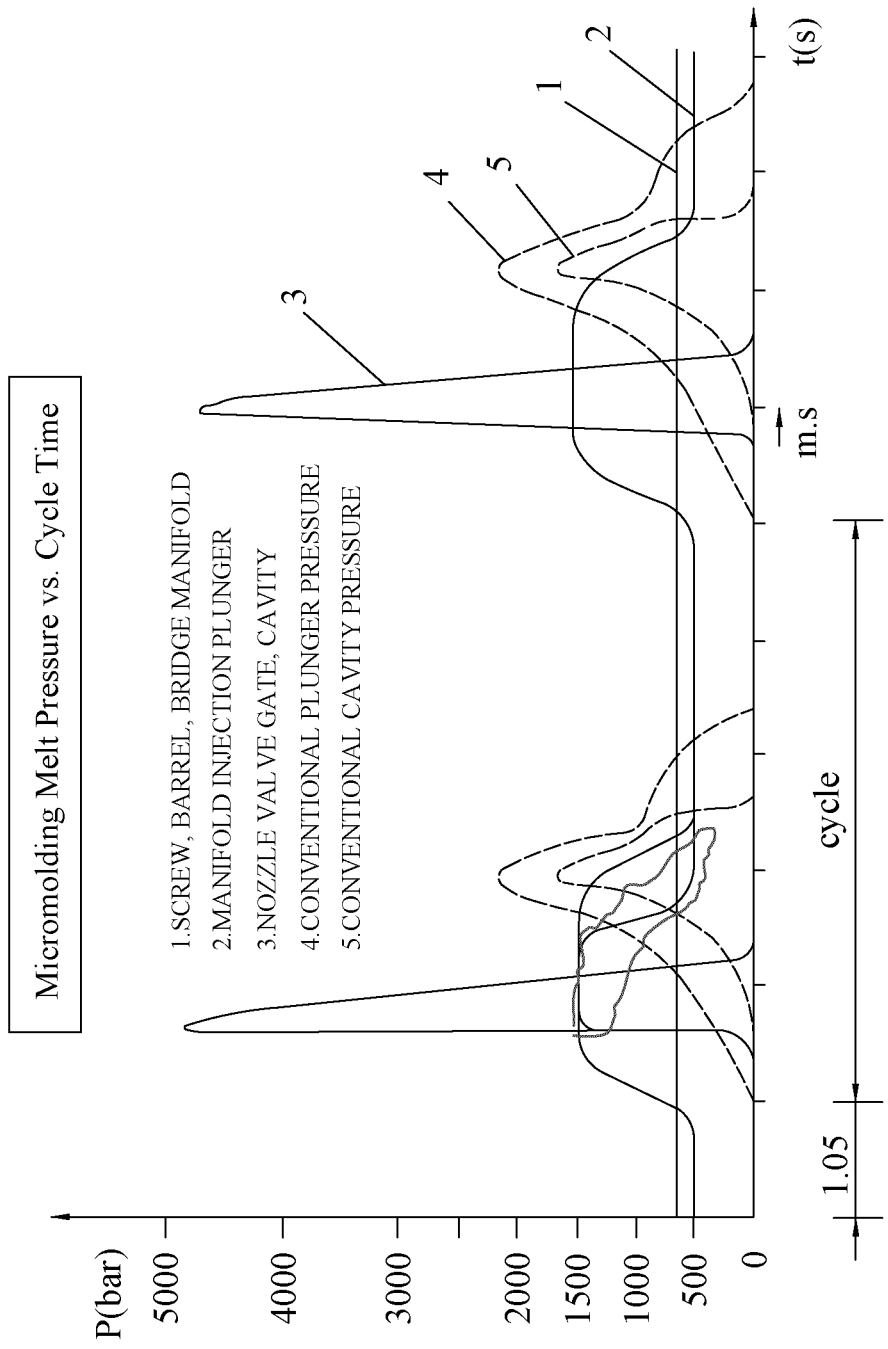
FIG. 7 is a graph showing pressure at various stages of the thermoplastic material going through a cycle of conventional prior art and the proposed method.

FIG. 7 shows the pressure at various stages of the thermoplastic material going through a cycle of conventional prior art and the proposed method. The pressure within the plasticizing barrel 102, manifold 108 is indicated by line 1 and is constant throughout the cycle time. The pressure within the manifold 108 is indicated by line 2. The pressure within the manifold 108 is more than the pressure within the chamber of the plasticizing barrel 102, but the pressure within the manifold 108 does not drop below the minimum pressure of the screw plunger (ie. Pressure A). The barrel has a minimum and maximum value. The rotary motor can rotate at different speeds (rpm, for example between 40-80 rpm) to control the position of the screw by adjusting the recharge volume. Recharging is independent of the machine cycle and could be recharged after any number of molding cycles. This hold pre-pressurized melt for a plurality of cycles. The pressure at the valve gate nozzle 106 is indicated by line 3. The spikes in line 3 are the sudden increase in pressure at the valve gate nozzle 106. Lines 4 and 5 are the conventional plunger and conventional cavity pressure lines. As opposed to the proposed method, the pressure in the convention plunger and conventional cavity drops to zero. As the pressure drops to zero in the conventional plunger and conventional cavity the peak pressure and melt (cavity fill time) achieved by the proposed method can never be attained in the conventional systems.

Figure 9:
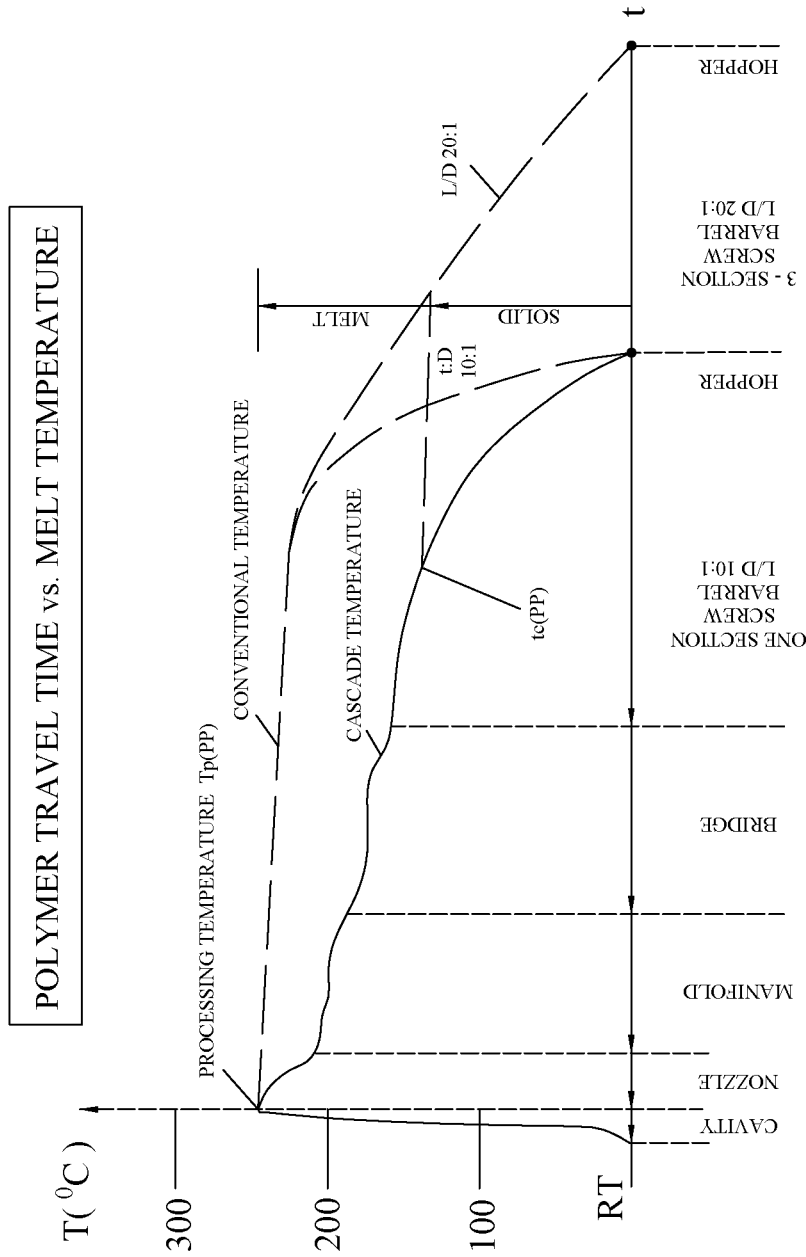
FIG. 9 is a graph showing comparison of temperature curve between the conventional system vs the cascading temperature of proposed method.

FIG. 9 is a comparison of temperature curve between the convention system vs the cascading temperature of proposed method. As seen in the figure, the time taken by the polymer, in the proposed method, to reach the processing temperature from the room temperature at the hopper is less compared to the time taken by the conventional systems. This greatly influences the residence time of the polymer in the proposed method. That is, the polymer spends much less time in the proposed method, due to the cascading of the temperature within the system, thus retaining the physical properties of the polymer when compared to the conventional systems.

Figure 10:
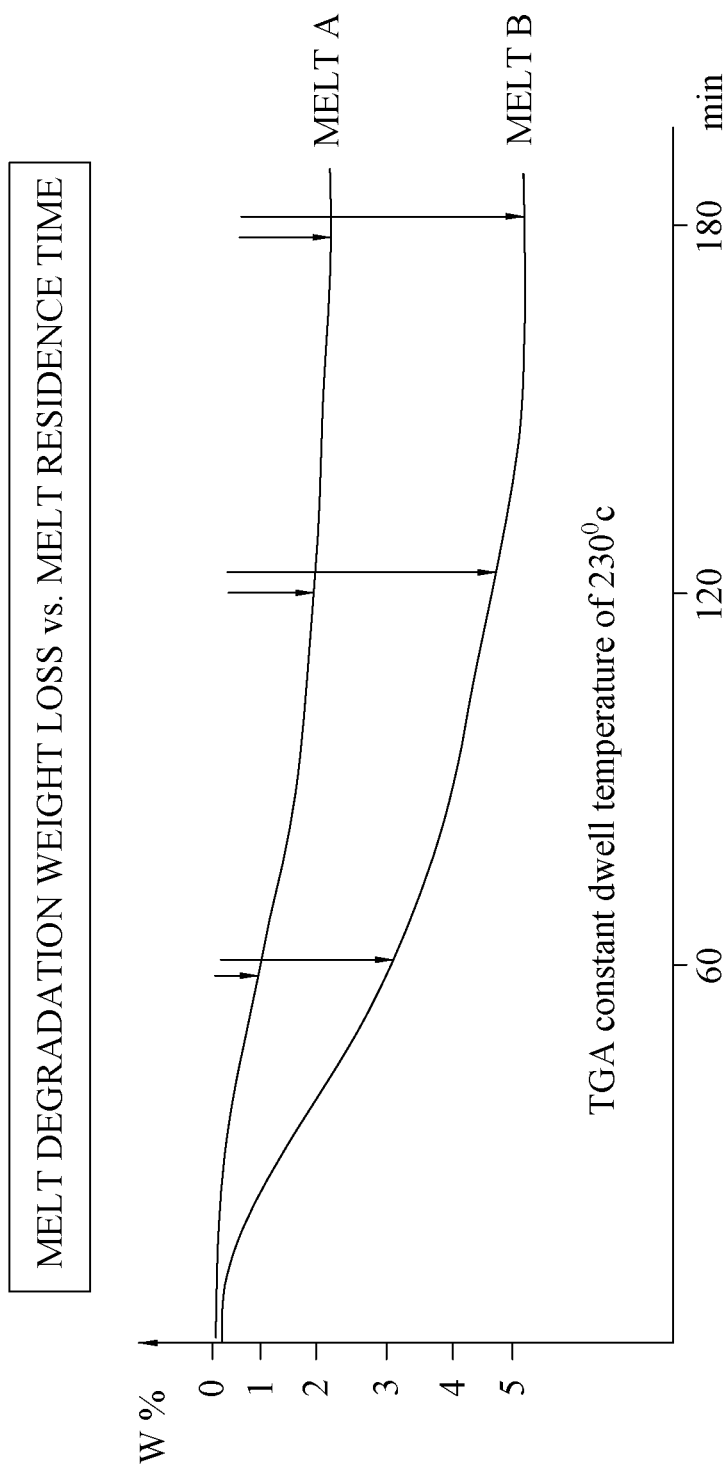
FIG. 10 is a graph showing melt degradation weight loss vs melt residence time.

FIG. 10 is a graph showing melt degradation weight loss vs melt residence time. The graph shows that the longer the melt is in the system the weight of the melt drops. As the weight of the melt keeps dropping the more the melt undergoes material degradation and loss of physical properties.

Figure 11:
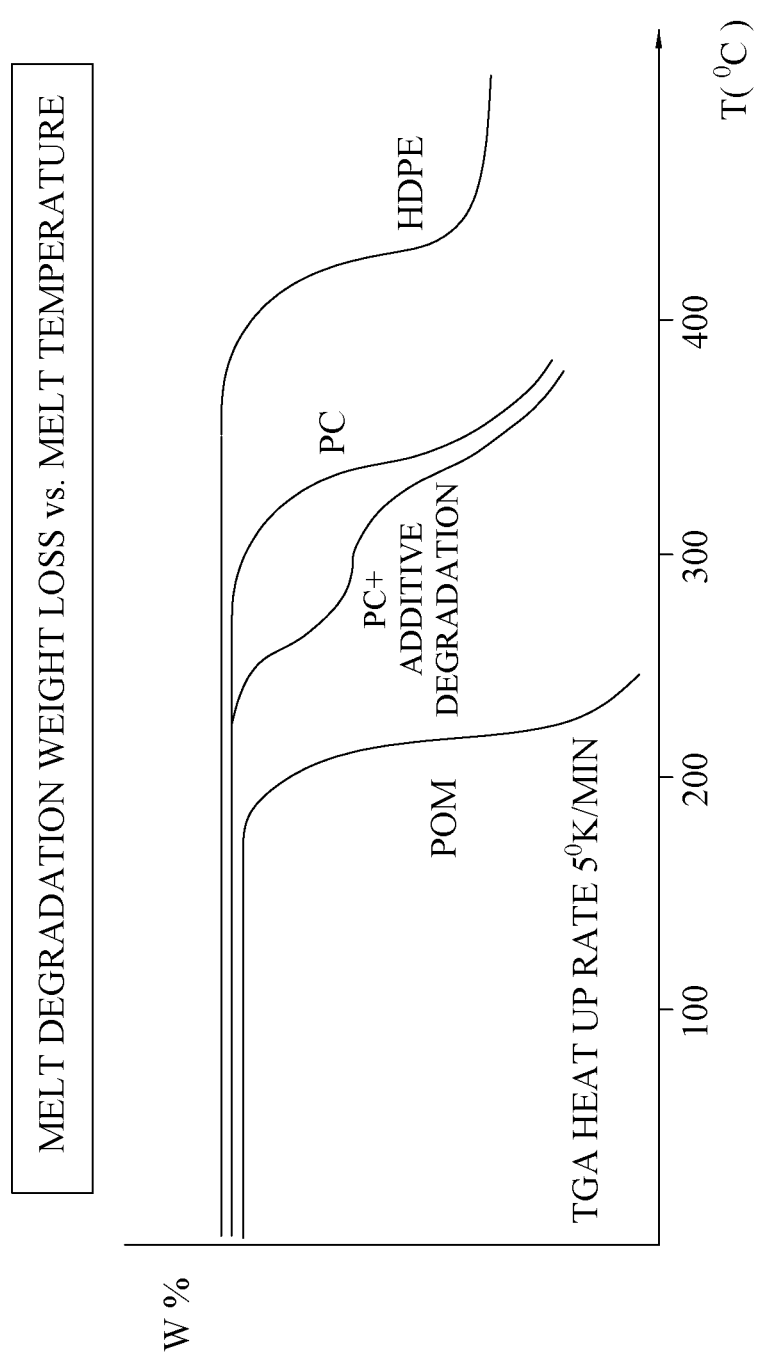
FIG. 11 is a graph showing melt degradation weight loss vs melt temperature.

FIG. 11 is a graph showing melt degradation weight loss vs melt temperature. The graph shows weight loss for various materials depicting the advantage of cascading the temperature at various stages of molding rather than maintaining the high temperature.

Figure 13:
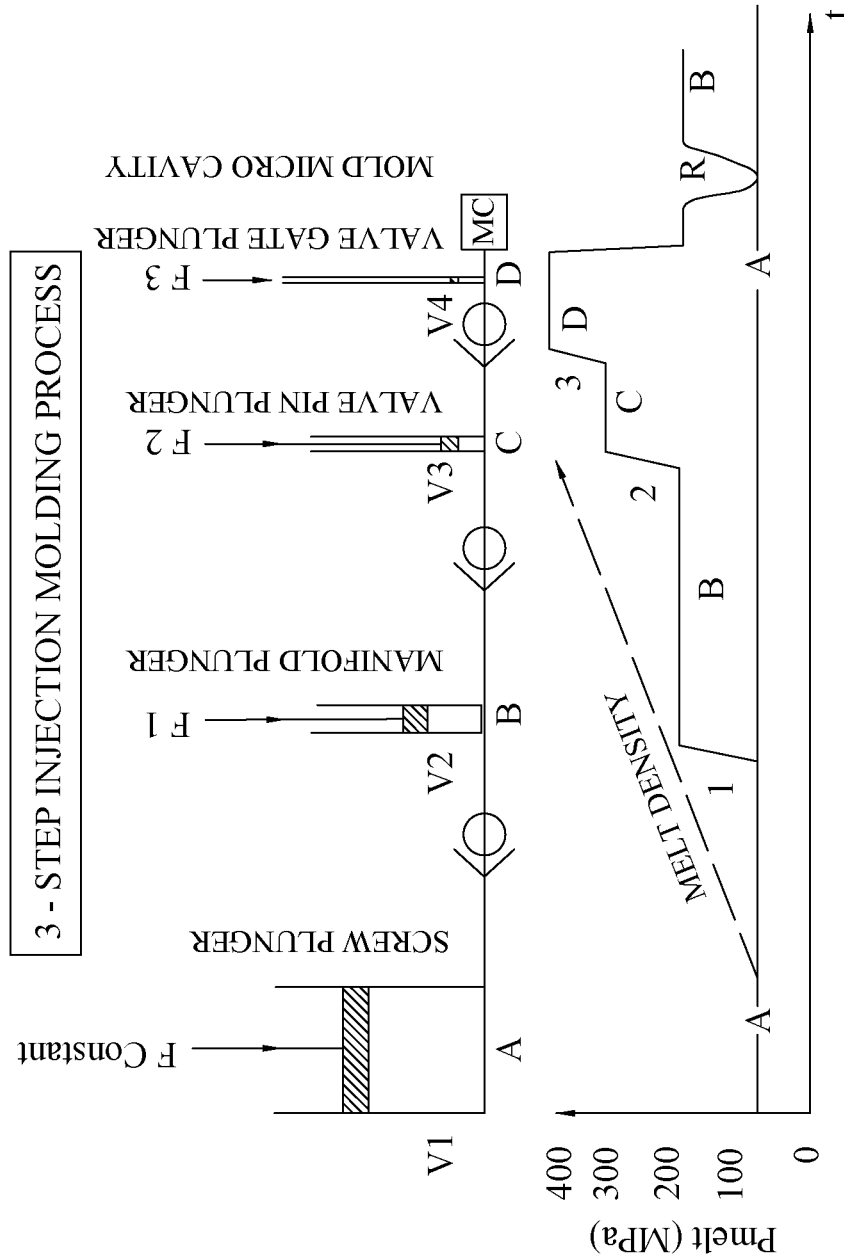
FIG. 13 is a graph showing the pressure and density of the melt as a function of time.

FIG. 13 is a graph showing the pressure and density of the melt as a function of time. A denotes the plasticizing barrel 102, wherein a constant force F is applied to the screw 118. The pressure within the plasticizing barrel chamber 102a is constant at a first level A. As the melt enters the manifold B, the manifold plunger 126 applies a force F1 on the melt increasing the melt pressure to B and the density of the melt in the process. The valve gate opens and the cavity fills. The valve pin plunger may then apply a force of F2 on the melt, when it closes thereby increasing the melt pressure to C and further increasing the density of the melt. A force of F3 may be applied on the melt within the nozzle 116 using the nozzle plunger 126. The melt may achieve a maximum pressure of D at the micro cavity 150 of the valve gate nozzle further increasing the density of the melt. The gate orifice or micro cavity 150 at the end of the melt channel is a cylindrical chamber into which the front end of the valve pin plunges to increase to the maximum pressure D. The micro volume (V4) is displaced into the cavity to provide the final spike in pressure. The ratio between the diameter of the micro volume chamber 150 and the end of the plunger 126 allows the generation of the high pressure, particularly in the moment when the check valve ahead of D is closed. This final ramp up in pressure before the valve into the mold cavity is opened results in the desired spike at D.

The method does not require the full processing temperature or the full injection pressure in the barrel as it is the requirement with the conventional single step or two step injection molding processes. With this method, the thermoplastic material in the plasticizing barrel 102 and in the manifold 108 can be kept at a much lower pressure and temperature, but at just enough temperature to bring the thermoplastic material above the melting range or crystallite melting point in order to obtain a low enough melt viscosity to feed the thermoplastic material with pressure through the manifold 108 and into the valve gate nozzle 106. As an example, shown in FIG. 12, polypropylene has a melting temperature of 160° C. and the processing temperature at 230° C. Then the first temperature of polypropylene within the plasticizing barrel would be for example 180° C. As another example, polycarbonate has a melting temperature of 150° C. and the processing temperature at 290° C. Then the first temperature of polycarbonate within the plasticizing barrel would be for example 250° C. The plasticizing barrel 102 has two or three temperature control zones. The first manifold 110 feeds the thermoplastic material into a submanifold 112 with two temperature control zones and the thermoplastic material finally reaches the valve gate nozzles 106 with individual temperature control zones. At the valve gate nozzle 106 the thermoplastic material is going to reach the optimum processing temperature for injection. The cascading of the thermoplastic material temperature improves the melt residence time in particular for thermal sensitive materials (e.g. POM, PC) and it allows the processing of direct gated micro parts between 1 mm³ to 10 mm³ volume without waste of material in cold runners and without thermal degradation. The method improves the injection molding process, and this results in higher quality micro parts.

With this method, semi-crystalline polymers such as HDPE, PP PBT, PA have an extreme short time window to crystallize inside a mold cavity. Smaller crystallites and less crystallite structures do result in different properties of the micro part. The extreme fast injection due to pre-compressed thermoplastic material fills the cavity of the mold 114 in milliseconds. The cavity of the mold 114 fill process does not cause a frozen layer formation at the cavity of the mold 114 wall as it is the case with larger parts. The comparative longer fill time associated with the melt compression and injection speed of single step or two step injection molding process where the melt pressure has to ramp up from atmospheric to the melt pressure is greatly reduces using this method. Further, using this method, the thermoplastic material fill reaches the end of the mold cavity much faster. With the proposed method, the plastic morphology inside and throughout the molded article is much more homogeneous and the molded article shows less inherent stress. Thermoplastic materials have a much higher thermal expansion factor in comparison to mold steel and this does affect the precise replication of a molded article in the cavity of the mold 114. The molded article does shrink or contract during cool down from the processing temperature. This is opposite to the melt expansion when the temperature of thermoplastic material increases.

The proposed method overcomes the shrinkage problem of the prior art by injecting the thermoplastic material into the cavity of the mold 114 with pre-compressed thermoplastic material at a cavity fill time within milliseconds that achieves a melt cavity pressure of 300 to 500 MPa. Comparing to the known two step plunger injection that starts after a plunger recharge with a low injection pressure that rises to the fill pressure and drops to the packing pressure, the proposed method injects the thermoplastic material with an already high pressure of up to 100 to 150 MPa with the nozzle plunger 126 being located close to the cavity of the mold 114. This has the advantage that the thermoplastic material is already in a compressed state when the valve gate nozzle 106 to the cavity of the mold 114 opens and it results in an ultra-high fill time reaching a high melt density in the cavity of the mold 114. As the valve gate nozzle 106 closes immediately after cavity of the mold 114 fills, the thermoplastic material density increases further inside the cavity of the mold 114 with a pressure of 300 to 500 MPa. The polymer molecules are getting so tight packed in the cavity of the mold 114 due to the high pressure and the increased thermoplastic material density. As a result, the mold article will not shrink during the cool down phase. This will result in a mold article which is an exact replication cavity of the mold 114.

The example embodiments described herein may be implemented in an operating environment comprising software installed on a computer, in hardware, or in a combination of software and hardware.

In an embodiment, the computer may include processing module, a memory module, input modules, output modules and a communication module.

The processing module is implemented in the form of one or more processors and may be implemented as appropriate in hardware, computer-executable instructions, firmware, or combinations thereof. Computer-executable instruction or firmware implementations of the processing module may include computer-executable or machine-executable instructions written in any suitable programming language to perform the various functions described.

The memory module may include a permanent memory such as hard disk drive, may be configured to store data, and executable program instructions that are implemented by the processor. The memory module may be implemented in the form of a primary and a secondary memory. The memory module may store additional data and program instructions that are loadable and executable on the processing module, as well as data generated during the execution of these programs. Further, the memory module may be volatile memory, such as random-access memory and/or a disk drive, or non-volatile memory. The memory module 204 may comprise of removable memory such as a Compact Flash card, Memory Stick, Smart Media, Multimedia Card, Secure Digital memory, or any other memory storage that exists currently or may exist in the future.

The input modules may provide an interface for input devices such as keypad, touch screen, mouse, microphone and stylus among other input devices.

The output modules may provide an interface for output devices such as display screen, speakers, printer and haptic feedback devices, among other output devices.

The communication module, as an example, may be a GPRS module, or other modules that enable communication. The communication module may include a modem, a network interface card (such as Ethernet card), a communication port, or a Personal Computer Memory Card International Association (PCMCIA) slot, among others. The communication module may include devices supporting both wired and wireless protocols. Data in the form of electronic, electromagnetic, optical, among other signals may be transferred via the communication module.

It shall be noted that the processes described above are described as sequence of steps; this was done solely for the sake of illustration. Accordingly, it is contemplated that some steps may be added, some steps may be omitted, the order of the steps may be re-arranged, or some steps may be performed simultaneously.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications; these should not be construed as limiting the scope of the invention but as merely providing illustrations of some of the personally preferred embodiments of this invention. Thus, the scope of the invention should be determined by the appended claims and their legal equivalents rather than by the examples given.

The invention claimed is:

1. A system for injection molding articles comprising:
a micro-molding machine including a controller; the controller having a processor executing computer readable instructions to:
melt and pre-pressurize thermoplastic material to a first level, within a plasticizing barrel of the micro-molding machine;
manipulate melt pressure of the thermoplastic material to a second level, within a hot runner of a manifold of the micro-molding machine, wherein the pressure within the manifold is held constant throughout the cycle time;
manipulate the melt pressure of the thermoplastic material to an ultra-cavity packing pressure within a micro cavity; and
increase temperature of the thermoplastic material in a cascading manner as the thermoplastic material travels from the plasticizing barrel to exit from a valve gate nozzle to enter the mold cavity.

2. The system according to claim 1, wherein pressure at the first level is less than the pressure at the second level, and the pressure at the second level is less than the ultra-cavity packing pressure.

3. The system according to claim 1, wherein the processor further executes computer readable instructions to: heat the thermoplastic material to a first temperature before the thermoplastic material exits the plasticizing barrel, wherein the first temperature is less than a processing temperature of the thermoplastic material; and heat the thermoplastic material to a processing temperature after the thermoplastic material exits a manifold but before the thermoplastic material exits a valve gate nozzle.

4. The system according to claim 1, wherein the processor further executes computer readable instructions to: heat the thermoplastic material to a first temperature before the thermoplastic material exits the plasticizing barrel, wherein the first temperature is less than a processing temperature of the thermoplastic material; regulate temperature of the thermoplastic material in a heated first manifold; regulate temperature of the thermoplastic material in a heated sub-manifold, which branches from the first manifold; and regulate temperature of the thermoplastic material in a heated nozzle through which the thermoplastic material enters a mold cavity.

5. The system according to claim 1, wherein the processor further executes computer readable instructions to:
actuate a first movement assembly to discharge the thermoplastic material out of the plasticizing barrel and into a manifold;
actuate a second movement assembly to control quantum of discharge of the thermoplastic material from the manifold and into a nozzle; and
actuate a third movement assembly to regulate discharge of the thermoplastic material out of the nozzle and into a mold cavity.

6. The system according to claim 5, wherein actuating the first movement assembly comprises rotating a screw located within the plasticizing barrel, actuating the second movement assembly comprises movement of a plunger in a first direction or a second direction, which is opposite of the first direction, based on desired quantum of discharge of the thermoplastic material from the manifold and into a nozzle, and actuating the third movement assembly comprises movement of a nozzle plunger in an opening direction or a closing direction to allow discharge of the thermoplastic material out of the nozzle or to arrest discharge of the thermoplastic material out of the nozzle, respectively.

7. The system according to claim 1, wherein the processor further executes computer readable instructions to prevent backflow of the thermoplastic material from a sub-manifold and into a first manifold past a first manifold check valve, wherein the sub-manifold branches from the first manifold.

8. The system according to claim 7, wherein the processor further executes computer readable instructions to prevent backflow of the thermoplastic material from the first manifold and into the plasticizing barrel past a plasticizing barrel check valve, wherein the first manifold receives the thermoplastic material from the plasticizing barrel.

9. The system according to claim 1, wherein the constant pressure in the manifold is predetermined.

* * * * *